United States Patent
McMahon

(10) Patent No.: US 9,844,977 B2
(45) Date of Patent: Dec. 19, 2017

(54) STAMPED WHEEL BALANCING WEIGHT

(71) Applicant: WEGMANN AUTOMOTIVE USA, a Delaware Corporation, Murfreesboro, TN (US)

(72) Inventor: Charles Robert McMahon, Murfreesboro, TN (US)

(73) Assignee: WEGMANN AUTOMOTIVE USA, a Delaware Corporation, Murfreesboro, TN (US)

(*) Notice: Subject to any disclaimer, the term of this patent is extended or adjusted under 35 U.S.C. 154(b) by 430 days.

(21) Appl. No.: 14/611,760

(22) Filed: Feb. 2, 2015

(65) Prior Publication Data

US 2015/0143699 A1    May 28, 2015

Related U.S. Application Data

(63) Continuation of application No. 13/467,444, filed on May 9, 2012, now Pat. No. 9,004,611.

(60) Provisional application No. 61/579,108, filed on Dec. 22, 2011.

(51) Int. Cl.
   *B60B 15/28* (2006.01)
   *F16F 15/32* (2006.01)
   *B21D 22/02* (2006.01)

(52) U.S. Cl.
   CPC ............. *B60B 15/28* (2013.01); *B21D 22/02* (2013.01); *F16F 15/324* (2013.01); *B60B 2310/206* (2013.01); *B60B 2310/306* (2013.01); *Y10T 29/496* (2015.01)

(58) Field of Classification Search
   CPC ........ F16F 15/324; B21D 22/02; B60B 15/28; B60B 2310/206; B60B 2310/306
   See application file for complete search history.

(56) References Cited

U.S. PATENT DOCUMENTS

| | | | |
|---|---|---|---|
| 2,122,065 A * | 6/1938 | Hume | F16F 15/324 301/5.21 |
| 3,633,263 A | 1/1972 | Hoeksema | |
| 3,688,380 A | 9/1972 | Dionys Hofmann et al. | |
| 6,238,005 B1 * | 5/2001 | Sugayauchi | F16F 15/324 301/5.21 |
| 6,250,721 B1 | 6/2001 | Oba et al. | |
| 6,364,421 B1 | 4/2002 | Pursley | |

(Continued)

FOREIGN PATENT DOCUMENTS

WO    2013/142664    9/2013

OTHER PUBLICATIONS

PCT International Search Report from ISA/US for PCT/US2013/033260 (published as WO 2013/142664 and related to U.S. Appl. No. 13/848,394 (published as US 2013/0285435)), dated Jun. 4, 2013.

*Primary Examiner* — Jacob Cigna
(74) *Attorney, Agent, or Firm* — Steven Meyer

(57) ABSTRACT

A wheel-balancing weight mounts to a wheel with a flange. The weight includes a body and a clip. The body is stamped by a punch to define a pocket within which an attaching portion of the clip resides. The defined pocket has a planar base and opposing side walls generally perpendicular to the base. The body as stamped by the punch includes a pre-stake for each side wall external to the pocket and adjacent the side wall, and an undercut for each side wall within the pocket and generally located at a juncture of the side wall and the base.

25 Claims, 4 Drawing Sheets

(56) References Cited

U.S. PATENT DOCUMENTS

| | | | |
|---|---|---|---|
| 6,553,831 B1 | 4/2003 | Schmidt et al. | |
| 6,592,188 B2 | 7/2003 | Yamaguchi | |
| 7,055,914 B1 * | 6/2006 | Jenkins | F16F 15/324 301/5.21 |
| 7,093,907 B2 * | 8/2006 | Jenkins | F16F 15/324 301/5.21 |
| 7,216,938 B2 * | 5/2007 | Phillips | F16F 15/324 301/5.21 |
| 7,249,804 B2 | 7/2007 | Zank et al. | |
| 7,841,669 B2 | 11/2010 | Zank | |
| 7,878,599 B2 | 2/2011 | Astorino et al. | |
| 7,883,156 B2 | 2/2011 | Pursley et al. | |
| 8,066,335 B2 * | 11/2011 | Jenkins | F16F 15/324 301/5.21 |
| 9,169,895 B2 * | 10/2015 | Everhard | F16F 15/345 |
| 2005/0104439 A1 * | 5/2005 | Phillips | F16F 15/324 301/5.21 |
| 2010/0253131 A1 * | 10/2010 | Jenkins | F16F 15/324 301/5.21 |
| 2011/0266862 A1 | 11/2011 | Halle | |
| 2013/0285435 A1 | 10/2013 | McMahon | |

\* cited by examiner

STAMPED WHEEL BALANCING WEIGHT

CROSS-REFERENCE TO RELATED APPLICATION

The present application is a continuation of U.S. patent application Ser. No. 13/467,444, filed on May 9, 2012, and entitled "STAMPED WHEEL BALANCING WEIGHT", hereby incorporated by reference in its entirety, which claims priority from U.S. Provisional Pat. Application No. 61/579,108, filed on Dec. 22, 2011, hereby incorporated by reference in its entirety.

FIELD

The present disclosure relates to a wheel-balancing weight for balancing a wheel of a vehicle or the like. More particularly, the present disclosure relates to a wheel balancing weight with a body stamped from a dimensioned wire rather than a machined body.

DISCLOSURE

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components. Moreover, when the tire and wheel are coupled to a moving vehicle such as a passenger car, the vibration can be uncomfortable to an occupant.

Accordingly, and as is known, such tire, wheel, or combination thereof is balanced by appropriately applying one or more counter-balancing weights to compensate for a measured imbalance. Wheel balancing weights are known, and are for example discussed in detail in U.S. Pat. Nos. 6,553,831, 7,216,938, 7,249,804, and 7,841669, hereby incorporated by reference in their entirety, among others. Typically, although by no means absolute, in the case where a tire is mounted to a wheel of a vehicle, the wheel includes a circumferential flange or lip at a rim on either axial side thereof and a weight of appropriate mass is applied at each flange at an appropriate circumferential location thereof. Methods of measuring imbalance and determining where to apply the counter-balancing weights are generally known to the relevant public and therefore need not be described herein.

In at least some instances, such a counter-balancing weight for a vehicle has been constructed to have a body forming the majority of the mass of the weight and a clip by which the body is secured to the flange of a wheel, where the clip is attached to the body by any of several attaching mechanisms. For example, the clip may be swaged to a face of the body or affixed to a face of the body by way of one or more screws, rivets, expansion bolts, or the like. At present, it is typical that the body is formed from a metal material such as zinc or steel or the like, where the body is at least partially machined. In particular, it is typical that the body includes a formed pocket within which a portion of the clip is fitted and then secured to the body to form the weight, where the formed pocket is cut into the body by one or more appropriate cutting, routing, or abrading tools or the like.

Notably, such cutting, routing, abrading, and other machining imparts a substantial amount of detail and complexity into the construction of the body and the weight overall. Accordingly, a need exists for a wheel-balancing weight with a clip and a body that is formed without the need for such cutting, routing, abrading, and other machining. More particularly, a need exists for such a wheel-balancing weight where the pocket of the body is formed from a stamping process and therefore is less costly to produce.

DRAWINGS

The present innovation will be better understood when read in conjunction with the appended drawings. For the purpose of illustrating the various embodiments of the invention, there are shown in the drawings embodiments that are presently preferred. As should be understood, however, the invention is not limited to the precise arrangements and instrumentalities shown. In the drawings:

FIGS. 1A-1C show a wheel-balancing weight with a stamped body in accordance with various embodiments of the present innovation, and in particular show a side-elevational view of a body of the weight only (FIG. 1A), a similar side elevational view of the weight with a clip attached to the body (FIG. 1B), and a cross-sectional view taken along the line 1C-1C in FIG. 1B (FIG. 1C);

FIGS. 2A-2D progressively show a punch stamping the body of the weight of FIG. 1 in accordance with various embodiments of the present innovation;

DESCRIPTION

Figure 1B:
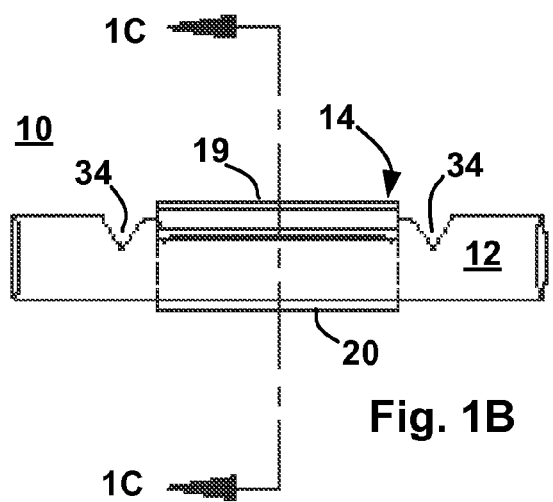

Certain terminology may be used in the following description for convenience only and is not considered to be limiting. For example, the words "left", "right", "upper", "lower", "top", "bottom", "front", and "back" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 1C:
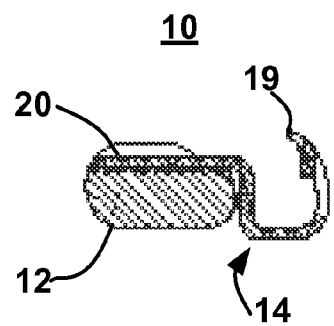
Figure 1A:
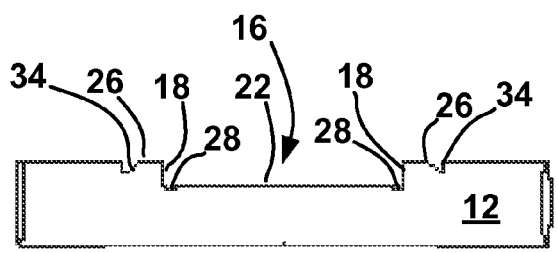
Figure 2D:
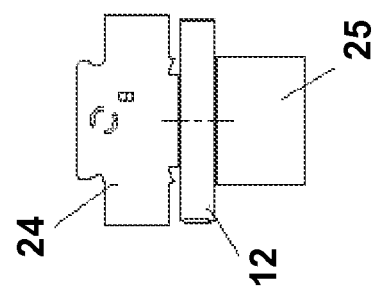
Figure 2C:
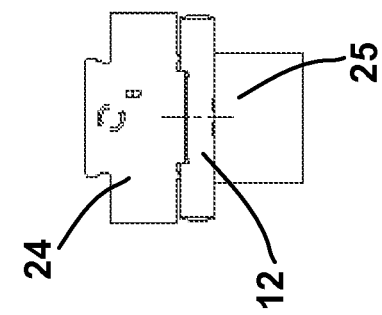
Figure 2B:
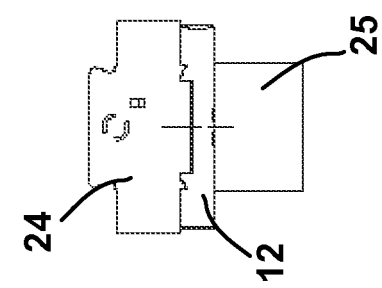
Figure 2A:
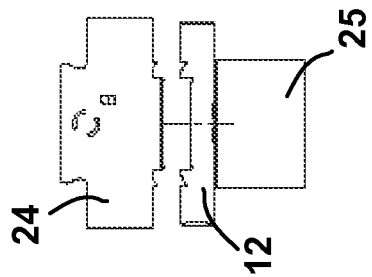

As shown in FIGS. 1A-1C, a wheel balancing weight 10 for a tire or the like includes a body 12 to impart mass and a clip 14 by which the body 12 is attached to a flange on a rim of the tire. Attaching such a weight 10 to such a flange by way of such a clip 14 is generally known or should be apparent to the relevant public and therefore need not be set forth herein in any detail other than that which is provided. Such attaching may be seen in one or more of the aforementioned U.S. Pat. Nos. 6,553,831, 7,216,938, 7,249,804, and 7,841669, which again are hereby incorporated by reference in their entirety.

The clip 14 is typically although by no means necessarily a length of a sheet of steel or the like with a relatively small thickness and a width on the order of an inch or so, where the sheet has been folded or bent along the length thereof in a predefined manner to be in a predefined form that includes a clipping portion 19 and an attaching portion 20, as is best seen in FIGS. 1B-1C. As is to be understood, the clipping portion 19 is formed to securely grasp the flange of the tire, and the attaching portion 20 is generally planar and co-acts with the body 12 to attach the clip 14 thereto. In particular, the clip 14 may be attached to the body 12 by positioning the attaching portion 20 thereof within a pocket 16 defined in the body 12, and then securing the attaching portion 20 to the body 12 by appropriate means such as a rivet or screw or other attaching device, or by being crimped or swaged by way of material in the body 12 adjacent the sides of the pocket 16. As seen, the pocket 16 is generally a relatively shallow and relatively planar depression mainly in a side (axial) face of the body 12, and may have a depth that is not much more than the thickness of the generally planar attaching portion 20 of the clip 14.

As should be appreciated, the pocket 16 is formed in such axial face of the body 12 to receive the attaching portion 20 of the clip 14, and in doing so to locate the clip 14 with respect to the body 12 in a relatively exact manner. Thus, the formed pocket 16 is defined by a generally planar base or bottom 22 against which a generally planar surface of the attaching portion of the clip 14 resides, and left and right side walls 18 that are generally perpendicular to and generally vertical with respect to the base 22. As may be appreciated, the side walls 18 tangentially locate the attaching portion 20 of the clip 14 within the pocket 16 of the body 12 and thus tangentially locate the clip 14 with respect to the body 12. As seen in FIG. 1C in particular, the clipping portion 19 of the clip 14 adjacent the attaching portion 20 may abut the body 12 when the clip 14 is secured to the body 12, and as such radially locates the clip 14 with respect to the body 12.

As may be appreciated, the pocket 16 may be machined into the body 12 by cutting, routing, abrading, or other machining tools that remove material from the body 12 to define the pocket 16, such that the machined pocket 16 has the planar base 22 and perpendicular side walls 18 set forth above. Note, though, that such machining is relatively more expensive in terms of time required, machinery involved, and wasted material, among other things. Accordingly, in various embodiments of the present innovation, and as seen in FIGS. 2A-2D, the pocket 16 is stamped into the body 12 according to a predefined punch to define the pocket 16, where the stamped pocket 16 has the planar base 22 and perpendicular side walls 18 set forth above. As should be appreciated, stamping the pocket 16 is advantageous as compared to machining the pocket 16 inasmuch as such stamping is relatively less expensive in terms of time required, machinery involved, and wasted material, among other things.

Figure 3:
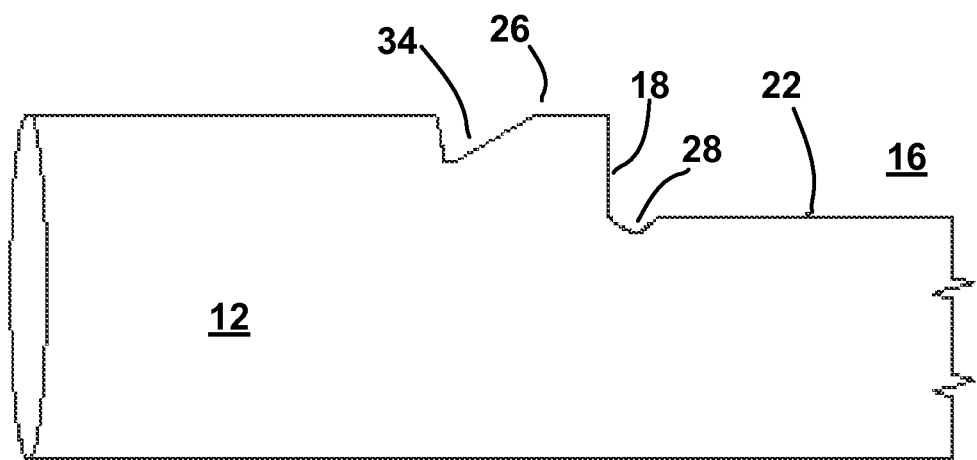
FIG. 3 shows a portion of the stamped body of FIG. 2 in accordance with various embodiments of the present innovation, where the punch imparts a pre-stake and an undercut to assist in forming a generally vertical or perpendicular side wall to a pocket of the body.

In various embodiments of the present innovation, the pocket 16 of the body 12 is stamped according to a punch or die 24 such as that seen in FIGS. 2A-2D so that the body 12 is imparted with a pre-stake 26 (also seen in FIG. 3) exterior to the pocket 16 but adjacent each side wall 18 of the pocket 16, and an undercut 28 within the pocket 16 generally at a juncture of each side wall 18 and the base 22 of the pocket 16. As best seen in FIG. 3, each pre-stake 26 as imparted to the body 12 is defined as a formed ridge of material exterior to the pocket 16 but immediately adjacent a respective side wall 18 thereof, where the ridge closely follows the side wall 18 and is bordered on one side by such side wall 18 and on the other side by a notch 34 formed by a cutting edge of the punch 24. In a similar manner, each undercut 28 as imparted to the body 12 is defined as a formed notch within the pocket 16 at the juncture of a respective side wall 18 and the base 22. Each pre-stake 26 and undercut 28 may follow along the entirety of a respective side wall 18 or may follow along only a portion of such respective side wall 18 as circumstances may warrant.

As shown in FIGS. 2A-2D, it may be that the punch 24 firstly strikes the body 12, which rests on a jig 25 or the like, to create the pocket 16 therein in a manner so that the pocket 16 and undercuts 28 begin to be formed (FIG. 2A to FIG. 2B), and then continues further with such strike to further form the pocket 16 and undercuts 28 and to create the pre-stakes 26 (FIG. 2B to FIG. 2C), after which the punch 24 is withdrawn (FIG. 2D), all in a single fluid striking motion. Notably, it has been found that imparting the body 12 with the pre-stake 26 and the undercut 28 for each side wall 18 in combination results in imparting the body 12 with the aforementioned generally perpendicular and/or vertical side walls 18. That is to say, without the pre-stakes 26 and undercuts 28, each side wall 18 would in effect be washed out by the striking force of the punch 24.

With the pre-stakes 26 and the undercuts 28, however, and as should be appreciated, the washing out of each side wall 18 is prevented and/or is rectified by the force exerted by the portions of the punch 24 that create each pre-stake 26 and undercut 38. In particular, a force exerted by the portion of the punch 24 that creates each pre-stake 26 moves adjacent material of the body 12 toward what becomes the respective side wall 18, and counters a force exerted by the portion of the punch 24 that creates each undercut 28 on the adjacent side wall 18 and moves adjacent material up and into formation. In combination, then, the two countering forces result in such generally vertical and/or perpendicular adjacent side wall 18.

Note that the geometry of each pre-stake 26 and each undercut 28 as created by respective portions of the punch 24 may be any appropriate geometry, although empirically it has been found that acceptable results are achieved by the geometry shown in FIG. 3. In such geometry, each pre-stake 26 as formed by the punch 24 of FIG. 2 is found to exhibit a notch 34 with a V-formation in cross-section, including a relatively shallower wall proximate the adjacent side wall 18 and a relatively steeper wall distal from the adjacent side wall 18. Similarly, each undercut 28 as formed by the punch of FIG. 2 is found to exhibit a notch mainly in the base 22 but abutting the adjacent side wall 18. Here, the notch of the undercut 28 may have a V-formation in cross-section, or may have a different formation such as a radiused curve. Likewise, the notch 34 of the pre-stake 26 may alternately have a different formation too.

Figure 4:
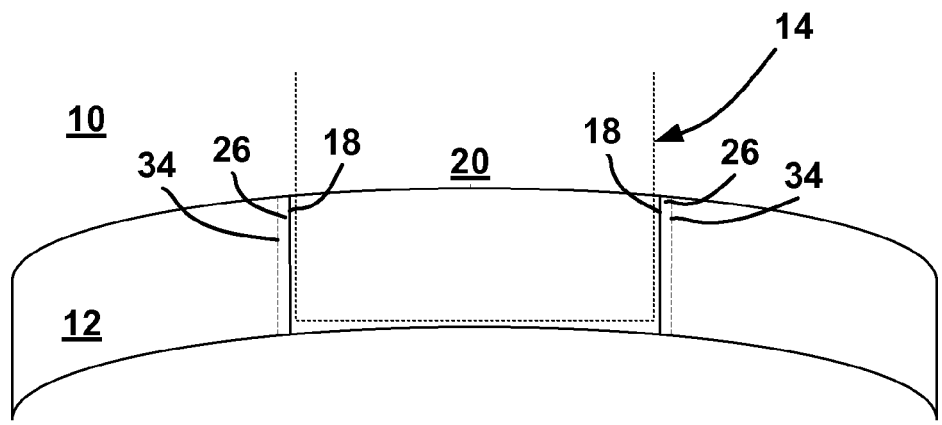
FIG. 4 shows a top view of the body and a portion of the clip of the weight of FIGS. 1A-1C.

Returning now to FIGS. 1A-1C, and also referring now to FIG. 4, it is seen that after the body 12 is stamped by the punch 24 of FIG. 2 to include the pocket 16, pre-stakes 26, and undercuts 28, a clip 14 may be appropriately positioned within the stamped pocket 16 (only the attaching portion 20 of the clip being shown in FIG. 4) and then secured to the body 12 by crimping, swaging, stamping, staking, or the like. Notably, such crimping, swaging, stamping, staking, or the like may take advantage of the already-stamped pre-stakes 26.

In particular, and as was alluded to above, each already-stamped pre-stake 26 includes or defines a notch 34 and a ridge or region of crimping material interposed between such notch 34 and the adjacent side wall 18, where the notch 34, ridge, and side wall 18 all extend along with each other for some length. As should be appreciated, such ridge or region of crimping material as defined is more easily urged over an adjacent edge of the attaching portion 20 of the positioned clip 14 within the pocket 16 during a crimping operation so as to secure such clip 14 to the body 12. Also, such notch 34 tends to define a zone within which a staking blade on a crimping tool can strike the body 12 (not shown) in order to perform such urging. Thus, and as may be appreciated from FIG. 1B in particular, after such a staking blade of such a crimping tool strikes the body 12 and indeed does urge each region of crimping material over the attaching portion 20 of the clip 14 as positioned within the pocket 16, the stamped pre-stake 26 has been altered to include or define a much deeper notch 34. Notably, such crimping by way of such staking blade is believed to require only a vertical downward force on the notch 34 of the pre-stake 26, and not an angled force on the region of crimping material, and thus may be performed in a simpler manner.

It is to be appreciated that most any appropriate equipment may be employed to stamp the body 12 of the weight 10 by way of the punch 24. For example, the equipment to stamp the body 12 in particular may receive a continuous feed of unwound wire having a predefined dimension, then straighten the wire, and then impart a curvature having a predefined radius to the wire so as to match the radius of the flange on the rim. Note here that the received wire may initially have a cross-sectional diameter on the order of one-quarter to one-half inch, and that the wire may also be flattened during straightening and/or curving into a somewhat oval or elliptical cross-section so as to fit more closely to the rim. Once curved, the wire is then fed to a coining station having the punch 24 of FIG. 2 such that the pocket 16 is stamped into the curved wire. Thereafter, an appropriate length of the curved and stamped wire may be cut off at a cut-off station so as to result in a unit of a body 12 having a predetermined mass.

Similarly, it is to be appreciated that most any appropriate equipment may be employed to crimp or otherwise securely attach a clip 14 to the stamped body 12 to form the weight 10. For example, the crimping equipment may receive and appropriately position a stamped body 12 in a jig or the like, and then receive and appropriately position an already-formed clip 14 in the same jig or the like. As should be understood, in so doing the attaching portion 20 of the clip 14 is appropriately tangentially and radially located within the pocket 16 of the body 12. Thereafter, the aforementioned staking blade of a crimping tool strikes the body 12 at each notch 34 of each pre-stake 26 to urge each ridge of crimping material over the attaching portion 20 of the clip 14 as positioned within the pocket 16, thereby securing the clip 14 to the body 12 and forming the weight 10.

Note here that each side wall 18 of the pocket 16 as imparted to the body 12 need not be absolutely vertical/perpendicular, but instead may approach such vertical/perpendicular state with respect to the base 22, without departing from the present innovation. That is to say, each side wall 18 should be well-formed to approach such vertical/perpendicular state, but only insofar as the side wall 18 positively tangentially locates the attaching portion 20 of the clip 14 within the pocket 16 of the body 12 without allowing the clip 14 to have more than minimal play as tangentially located. Accordingly, if the side wall 18 were to be on the order of 15 or even 30 degrees out of true perpendicular/vertical but still positively locates the clip 14, such side wall 18 would be acceptable.

Figure 5:
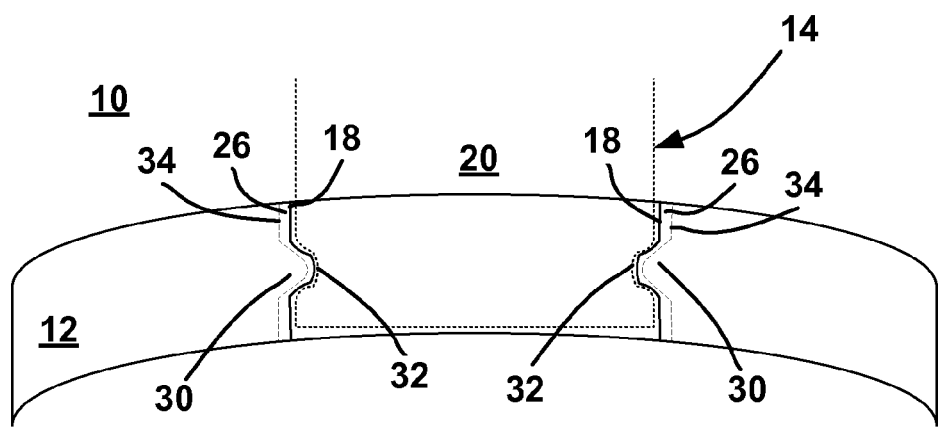
FIG. 5 shows a top view of a weight similar to that of FIGS. 1A-1C in accordance with alternate embodiments of the present innovation.

In various embodiments, the side walls 18 of the body 12 may be generally planar and parallel with respect to each other, such as is seen in FIG. 5. Such side walls 18 may alternately be generally planar but angled with respect to each other, perhaps such that the pocket 16 exhibits a generally trapezoidal appearance when viewed according to the top view of FIG. 4. Such side walls 18 need not necessarily be planar, however. In one embodiment, for example, and as seen in FIG. 5, each side wall 18 may exhibit one or more protrusions 30 that each extend along the surface of the body 12 and toward the pocket 16, thereby reducing the area of the pocket 16. As may be appreciated, each such protrusion 30 may key to a corresponding indentation 32 in a corresponding side edge of the attaching portion 20 of the clip 14 (partially shown in FIG. 5), and in so doing may positively radially locate the clip 14 within the pocket 16 of the body 12.

Note that by including such a protrusion 30 for each side wall 18 as in FIG. 5, the pre-stake 26 and undercut 28 for each side wall 18 may require alteration to form the side wall 18 with such a protrusion 30. In particular, the pre-stake 26 and undercut 28 may closely follow the side wall 18 with the protrusion 30 in order to form same, as is shown, or may generally follow the side wall 18 with the protrusion 30 to form same if such close following has not been found to be needed.

Note too that rather than including a protrusion 30 in each side wall 18 and an indentation 32 in each side edge of the attaching portion 20 of the clip 14, the protrusions 30 and indentations 32 may be exchanged so that an indentation 32 is in each side wall 18 and a protrusion 30 is in each side edge of the attaching portion 20 of the clip 14. In such a case, and again, the pre-stake 26 and undercut 28 for each side wall 18 may require alteration to form the side wall 18 with such an indentation 32.

CONCLUSION

In the foregoing description, it can be seen that the present innovation comprises a new and useful stamped wheel balancing weight 10 having a clip 14 and a stamped body 12 that is formed without the need for cutting, routing, abrading, and other machining. Therefore, the body 12 and the weight 10 are less costly to produce. It should be appreciated that changes could be made to the embodiments described above without departing from the innovative concepts thereof. For one example, the form of the pocket 16 of the stamped body 12 may differ, as may the form of the pre-stakes 26 and undercuts 28. It should be understood, therefore, that this innovation is not limited to the particular embodiments disclosed, but it is intended to cover modifications within the spirit and scope of the present disclosure.

The invention claimed is:

1. A method of producing a wheel balancing weight for mounting to a wheel with a flange, the weight including a body and a clip, the body for providing a predetermined mass to the weight and the clip for securely grasping the flange to secure the weight thereto, the method comprising:
   initially stamping the body at an attaching face thereof by a punch to define a pocket in the attaching face within which an attaching portion of the clip is to reside, the defined pocket having a planar base and opposing side walls perpendicular to the base;
   further stamping the body at the attaching face thereof by the punch to include a pre-stake in the attaching face for each side wall external to the pocket and adjacent the side wall, and an undercut for each side wall within the pocket and located at a juncture of the side wall and the base; and
   withdrawing the punch from the attaching face of the body,
   the initially stamping, further stamping, and withdrawing being performed by the punch in a single fluid striking motion, each pre-stake being defined in the body to include a formed ridge of material exterior to the pocket and immediately adjacent a respective side wall thereof, the ridge following the side wall and being bordered on a first lateral side thereof by such side wall and on a second lateral side thereof by a notch formed by a cutting edge of the punch within the attaching face of the body, the method further comprising positioning the attaching portion of the clip within the pocket and striking the body to urge the ridge over an adjacent edge of the attaching portion of the positioned clip to secure the clip to the body.

2. The method of claim 1 the method comprising striking the body at each notch to urge the ridge over an adjacent edge of the attaching portion of the positioned clip to secure the clip to the body, the striking of the body altering the stamped pre-stake to deepen the notch within the attaching face of the body.

3. The method of claim 1 comprising stamping the body to define each undercut as a formed notch within the pocket at a juncture of a respective side wall and the base.

4. The method of claim 1 comprising stamping the body to define each undercut as a formed notch within the pocket at a juncture of a respective side wall and the base, the notch being in the base but abutting the side wall, and having a radiused curve formation in cross-section.

5. The method of claim 1 comprising stamping the body to define each pre-stake to follow along a respective side wall.

6. The method of claim 1 comprising stamping the body to define the pre-stake and the undercut for each side wall in combination resulting in imparting the body with the perpendicular side wall.

7. The method of claim 1 further comprising securing the clip to the body by crimping or swaging the body at the pre-stakes to urge material of the body adjacent the side walls thereof over side edges of the attaching portion of the clip as resident in the pocket.

8. The method of claim 1 comprising stamping the body to define each side wall as linear and to define the side walls as parallel.

9. The method of claim 1 comprising stamping the body to define each side wall to include a protrusion extending along the attaching face of the body and toward the pocket.

10. The method of claim 1 comprising stamping the body to define each side wall to include a protrusion extending along the attaching face of the body and toward the pocket, the pre-stake and under-cut for the side wall following the protrusion.

11. The method of claim 1 comprising stamping the body to define each side wall to include a protrusion extending along the attaching face of the body and toward the pocket, the attaching portion of the clip including a corresponding indentation in a corresponding side edge thereof, the protrusion keying to the indentation and positively radially locating the clip within the pocket of the body.

12. The method of claim 1 wherein the attaching face is an axial face of the body.

13. A method of producing a wheel balancing weight for mounting to a wheel with a flange, the weight including a body and a clip, the body for providing a predetermined mass to the weight and the clip for securely grasping the flange to secure the weight thereto, the method comprising:

initially stamping the body at an attaching face thereof by a punch to define a pocket in the attaching face within which an attaching portion of the clip is to reside, the defined pocket having a planar base and opposing side walls perpendicular to the base;

further stamping the body at the attaching face thereof by the punch to include a pre-stake in the attaching face for each side wall external to the pocket and adjacent the side wall, and an undercut for each side wall within the pocket and located at a juncture of the side wall and the base; and withdrawing the punch from the attaching face of the body, the initially stamping, further stamping, and withdrawing being performed by the punch in a single fluid striking motion, each pre-stake being defined in the body to include a formed ridge of material exterior to the pocket and immediately adjacent a respective side wall thereof, the ridge following the side wall and being bordered on a first lateral side thereof by such side wall and on a second lateral side thereof by a notch formed by a cutting edge of the punch, the method further comprising securing the clip to the body by crimping or swaging the body at the notches of the pre-stakes to urge the respective ridges over side edges of the attaching portion of the clip as resident in the pocket, the crimping or swaging action enlarging each notch.

14. The method of claim 13 comprising stamping the body to define each undercut as a formed notch within the pocket at a juncture of a respective side wall and the base.

15. The method of claim 13 comprising stamping the body to define each undercut as a formed notch within the pocket at a juncture of a respective side wall and the base, the notch being in the base but abutting the side wall, and having a radiused curve formation in cross-section.

16. The method of claim 13 comprising stamping the body to define each pre-stake to follow along a respective side wall.

17. The method of claim 13 comprising stamping the body to define the pre-stake and the undercut for each side wall in combination resulting in imparting the body with the perpendicular side wall.

18. The method of claim 13 comprising stamping the body to define each side wall as linear and to define the side walls as parallel.

19. The method of claim 13 comprising stamping the body to define each side wall to include a protrusion extending along the attaching face of the body and toward the pocket.

20. The method of claim 13 comprising stamping the body to define each side wall to include a protrusion extending along the attaching face of the body and toward the pocket, the pre-stake and under-cut for the side wall following the protrusion.

21. The method of claim 13 comprising stamping the body to define each side wall to include a protrusion extending along the attaching face of the body and toward the pocket, the attaching portion of the clip including a corresponding indentation in a corresponding side edge thereof, the protrusion keying to the indentation and positively radially locating the clip within the pocket of the body.

22. The method of claim 13 wherein the attaching face is an axial face of the body.

23. A method of producing a wheel balancing weight for mounting to a wheel with a flange, the weight including a body and a clip, the body for providing a predetermined mass to the weight and the clip for securely grasping the flange to secure the weight thereto, the method comprising:

initially stamping the body at an attaching face thereof by a punch to define a pocket in the attaching face within which an attaching portion of the clip is to reside, the defined pocket having a planar base and opposing side walls perpendicular to the base; and further stamping the body at the attaching face thereof by the punch to include a pre-stake in the attaching face for each side wall external to the pocket and adjacent the side wall, and an undercut for each side wall within the pocket and located at a juncture of the side wall and the base, each stamped pre-stake including a formed ridge of material exterior to the pocket and immediately adjacent a respective side wall thereof, the ridge following the side wall and being bordered on a first lateral side thereof by such side wall and on a second lateral side thereof by a notch formed by a cutting edge of the punch, the method further comprising positioning the attaching portion of the clip within the pocket and striking the body at each notch to secure the clip within the pocket, the strike at each notch urging the respective ridge over a side edge of the attaching portion of the clip as resident in the pocket.

24. The method of claim 23 comprising stamping the body to define each side wall as linear and to define the side walls as generally parallel.

25. The method of claim 23 comprising stamping the body to define each side wall to include a protrusion extending along the attaching face of the body and toward the pocket.

\* \* \* \* \*